UNITED STATES PATENT OFFICE 2,380,157

PRODUCTION OF CELLULOSE DERIVATIVES

Henry Dreyfus, London, England, assignor to Celanese Corporation of America, a corporation of Delaware No Drawing. Application May 20, 1942, Serial No. 443,806. In Great Britain May 16, 1941

11 Claims. (Cl. 8—116.2)

This invention is concerned with improvements in or relating to the production of cellulose derivatives.

According to the present invention the properties of cellulose materials are improved by reacting them with organic dicyanamides, i. e. compounds containing two radicles having the formula:

The treatment with dicyanamides results in an improvement in the physical properties of the materials. In particular, the safe ironing temperature and melting point of materials made of organic acid esters and ethers of cellulose may be improved and the solubility of the materials in organic solvents may be reduced. The treatment is applicable mainly to formed articles, for example yarns, foils and the like.

The materials treated may be natural cellulosic materials, for example cotton linters, chemical wood pulp and cotton yarns, regenerated cellulose materials obtained by the viscose or cuprammonium process or by the saponification of cellulose acetate or other organic ester of cellulose, or materials made of an organic derivative of cellulose containing free hydroxy groups. For instance, the process may be applied to the treatment of yarns of high tenacity in hank or fabric form obtained by the stretching of acetone-soluble cellulose acetate, for example to 5 or 10 times its original length in wet steam or hot water under pressure, or to yarns of regenerated cellulose made by the saponification of the above stretched cellulose acetate yarns. The yarns may be of ordinary viscosity or the high viscosity yarns produced as described in U. S. Application S. No. 400,122, filed June 27, 1941.

Examples of cyanamides which may be employed are those compounds containing two radicles of the formulae:

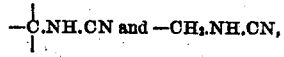

and those compounds having the formulae: $NC.NH.(CH_2)_n.NH.CN$ where $n$ is an integer, $NC.NH(CH_2)_n.X.(CH_2)_n.NH.CN$ where $n$ is an integer and X is a di-valent non-metallic atom, and

where R is an aromatic residue and $R_1$ and $R_2$ are alkylene radicles, more specifically ethylene and hexamethylene dicyanamides, beta,beta' di-cyanamido-diethyl ether, beta,beta' di-cyanamido-diethyl sulphide and di(beta-cyanamido-ethyl) benzenes. They may be produced as described, for example in No. 2,349,851.

The reactions may be effected by heating the materials in a solution of a dicyanamide. Preferably a fairly dilute solution containing, for example 2.5% of di-cyanamide, is employed and the reaction temperature is between 50° and 150° C., particularly 100 to 120° C.

Cellulosic materials may be treated with a solution which contains the dicyanamide and which is a solvent for the materials if alteration of their physical state is immaterial. For instance, cellulose acetate in fibrous or powder form may be refluxed with a solution of a dicyanamide in acetone and on completion of the reaction may be precipitated by the addition of a non-solvent or separated from the reaction medium if the reaction has been carried sufficiently far to render it insoluble therein.

As indicated above, however, the present process is of most value for the treatment of artificial filaments, foils and other shaped articles and in such a case should be carried out with a reaction medium which does not deleteriously affect their physical condition.

Such a process is preferably effected by impregnating the articles with a solution of the dicyanamide in a volatile solvent, e. g., alcohol, acetone or chloroform, concentrating the di-cyanamide on the material by evaporation of the volatile solvent and then heating the impregnated articles until the required reaction has taken place, which usually necessitates about 15 mins. to 1 hour at a temperature of 100–120° C.

Usually a fairly low proportion of dicyanamide to cellulosic materials is sufficient to give the improved properties, for example a proportion by weight of about 2.5 or 10%. The concentration of the dicyanamide in an impregnating medium may be such that the required amount is obtained on the material on its withdrawal from the impregnating medium. Alternatively, a higher concentration may be used and the impregnated material subsequently hydro-extracted or otherwise treated so as to reduce its content of impregnating medium to the required amount before the volatile solvent is evaporated off.

The following examples are given to illustrate the invention.

Example 1

A fabric made of regenerated cellulose is immersed in a 2% solution of hexamethylene dicyanamide in acetone at 40° C. for about 10 minutes and is then withdrawn and hydro-extracted until it retains about its own weight of liquor. It is then heated for half an hour at 110° C. under such conditions that the acetone can evaporate, after which it is scoured and dried.

Example 2

A cellulose acetate fabric made of cellulose acetate yarn which has been stretched in wet steam to about 10 times its original length, is reacted with hexamethylene dicyanamide in a similar manner to that described in Example 1, using a solution of the dicyanamide in alcohol.

Having described my invention what I desire to secure by Letters Patent is:

1. Process for the treatment of cellulosic materials which comprises reacting them with an organic compound containing two radicles having the formula:

2. Process for the treatment of cellulosic filaments, foils and similar materials, which comprises reacting them with an organic compound containing two radicles having the formula:

3. Process for the treatment of filaments, foils and similar materials having a basis of regenerated cellulose, which comprises reacting them with an organic compound containing two radicles having the formula:

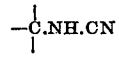

4. Process for the treatment of filaments, foils and similar materials having a basis of cellulose acetate, which comprises reacting them with an organic compound containing two radicles having the formula:

5. Process for the treatment of cellulosic materials, which comprises impregnating the materials with a dilute solution of an organic compound containing two radicles having the formula: —CH$_2$.NH.CN and heating the impregnated materials to a temperature between 50 and 150° C.

6. Process for the treatment of cellulosic materials, which comprises impregnating the materials with a 1 to 5% solution of an organic compound having the formula:

NC.NH.(CH$_2$)$_n$.NH.CN where $n$ is an integer and heating the impregnated materials to a temperature between 100 and 120° C.

7. Process for the treatment of cellulosic materials, which comprises impregnating the materials with a 1 to 5% solution of an organic compound having the formula: NC.NH.(CH$_2$)$_6$.NH.CN and heating the impregnated materials to a temperature between 100 and 120° C.

8. Process for the treatment of cellulosic materials, which comprises impregnating the materials with a 1 to 5% solution of an organic compound having the formula:

NC.NH(CH$_2$)$_n$.X.(CH$_2$)$_n$.NH.CN where $n$ is an integer and X is a di-valent non-metallic atom, and heating the impregnated materials to a temperature between 100 and 120° C.

9. Process for the treatment of cellulosic materials, which comprises impregnating the materials with a 1 to 5% solution of an organic compound having the formula:

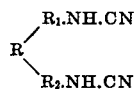

where R is an aromatic residue and R$_1$ and R$_2$ are alkylene radicles and heating the impregnated materials to a temperature between 100 and 120° C.

10. Process for the treatment of shaped cellulosic materials, which comprises impregnating the materials with a dilute solution of an organic compound containing two radicles having the formula:

—CH$_2$.NH.CN in a liquid which is a non-solvent for the cellulosic materials, and heating the impregnated materials to a temperature between 50 and 150° C.

11. Process for the treatment of shaped cellulose acetate materials, which comprises impregnating the materials with a 1 to 5% solution of an organic compound having the formula:

NC.NH.(CH$_2$)$_6$.NH.CN in ethyl alcohol and heating the impregnated materials to a temperature between 100 and 120° C.

HENRY DREYFUS.